(12) United States Patent
Kawanishi et al.

(10) Patent No.: US 7,106,497 B2
(45) Date of Patent: Sep. 12, 2006

(54) LOW-NOISE OPTICAL FREQUENCY CONVERTER

(75) Inventors: Tetsuya Kawanishi, Koganei (JP); Masayuki Izutsu, Koganei (JP)

(73) Assignee: National Institute of Information and Communications Technology, Koganei (JP)

( * ) Notice: Subject to any disclaimer, the term of this patent is extended or adjusted under 35 U.S.C. 154(b) by 119 days.

(21) Appl. No.: 10/627,782

(22) Filed: Jul. 28, 2003

(65) Prior Publication Data

US 2004/0085620 A1 May 6, 2004

(30) Foreign Application Priority Data

Aug. 19, 2002 (JP) ............................. 2002-238481
Aug. 22, 2002 (JP) ............................. 2002-242361

(51) Int. Cl.
*G02F 2/02* (2006.01)
(52) U.S. Cl. ...................................... 359/326
(58) Field of Classification Search ......... 359/326–332
See application file for complete search history.

(56) References Cited

U.S. PATENT DOCUMENTS 5,532,867 A * 7/1996 Hayes et al. ................. 359/329
6,259,836 B1 * 7/2001 Dodds .......................... 385/24

FOREIGN PATENT DOCUMENTS

JP    59-113424    6/1984

OTHER PUBLICATIONS

S. Shimotsu, et al., Optical Alliance, vol. 27, pp. 27-30, "LiNbO₃ Optical SSB Modulator for Next-Generation Communications ", Jul. 2000 ( with partial English translation ).
K. Higuma, et al., Technical Report of IEICE, OPE 2001-159, 6 pages , "The Development of X-Cut LiNbO₃ Optical Frequency Shifter/ SSB-SC Modulator", Feb. 2002 ( with English Abstract ).
S. Shimotsu, et al., "Single Side-Band Modulation Performance of a LiNbO₃ Integrated Modulator Consisting of Four-Phase Modulator Waveguides", IEEE, Photonics Technology Letters, vol. 13, No. 4, Apr. 2001, pp. 364-366.
Kaoru Higuma, et al., "X-cut LiNbO₃ optical SSB modulators", LASERS and Electro-Optics, 2001, Cleo/Pacific Rim 2001, The 4th Pacific Rim Conference, vol. 1, Jul. 15, 2001, pp. I-104-I-105.

* cited by examiner

Primary Examiner—John D. Lee
(74) Attorney, Agent, or Firm—Oblon, Spivak, McClelland, Maier & Neustadt, P.C.

(57) ABSTRACT

A low-noise optical frequency converter uses a predetermined microwave electric signal to modulate an input light wave and output a light wave that includes a first-order upper-sideband or lower-sideband and a third-order lower-sideband or upper-sideband. The frequency converter modulates a light wave identical to the input light wave with a signal having a frequency that is three times that of the microwave signal, to form a first light wave having a first-order lower-sideband or upper-sideband. The first light wave is mixed with a second light wave having a first-order upper-sideband or lower-sideband and a third-order lower-sideband or upper-sideband, with a phase of the third-order lower-sideband or upper-sideband reversed to a phase of the first light wave, thereby suppressing third-order sidebands.

13 Claims, 4 Drawing Sheets

LOW-NOISE OPTICAL FREQUENCY CONVERTER

BACKGROUND OF THE INVENTION

1. Field of the Invention

The present invention relates to a low-noise optical frequency converter that is able to convert light having a reference frequency to light having a controlled frequency difference.

2. Description of the Prior Art

Optical frequency converters use a number of ways to convert the frequency of input light, including (1) a method using non-linear optical crystal to mix two light inputs that is a well-known method also used for doubling laser frequencies; (2) a method using a mode-locked laser that comprises using an optical modulator, isolator and Fabry-Perot etalon provided in a laser resonator to generate optical pulses, which method is also used to generate a sideband of a frequency fp that is Km times higher than the phase modulation frequency fm (fp=Km×fm); and (3) a method modulating the light with a microwave signal to derive a sideband that is used to convert the optical frequency.

The above method (3) can be further subdivided into (3-1) a method in which the input light is intensity-modulated or phase-modulated by a microwave signal and the target sideband is selectively extracted by using a filter or the like, to obtain light having a frequency that is the sum or difference of the light frequency and the frequency of the microwave signal, and whose merit is the ability to select just the target sideband and whose drawback is that it requires a filter, and in cases where the microwave signal is to be changed, the filter characteristics have to be adjusted accordingly; and (3-2) a method in which input light is phase-modulated by a microwave signal, an optical circuit is used to cancel the optical carrier and a sideband on one side, and the other sideband is extracted to convert the optical frequency and which method is known as single sideband (SSB) modulation and does not use a filter, so there is no need to adjust a filter even when the microwave signal is to be changed though a drawback is that the obtained optical signal contains order sidebands.

The present invention relates to the method (3-2) mentioned above and will be described below.

Optical SSB modulation is described in detail in, for example, Reference 1 (Shimotsu, Izutsu, et al., "LiNbO$_3$ optical SSB modulator for next-generation communications," Optical Alliance, vol. 27, July 2000) and Reference 2 (Higuma, et al., "Development of optical frequency shifter/SSB-SC modulator using X-cut LiNbO$_3$," Technical Report of IEICE, OPE 2001-159 (2002-2)).

Figure 1:
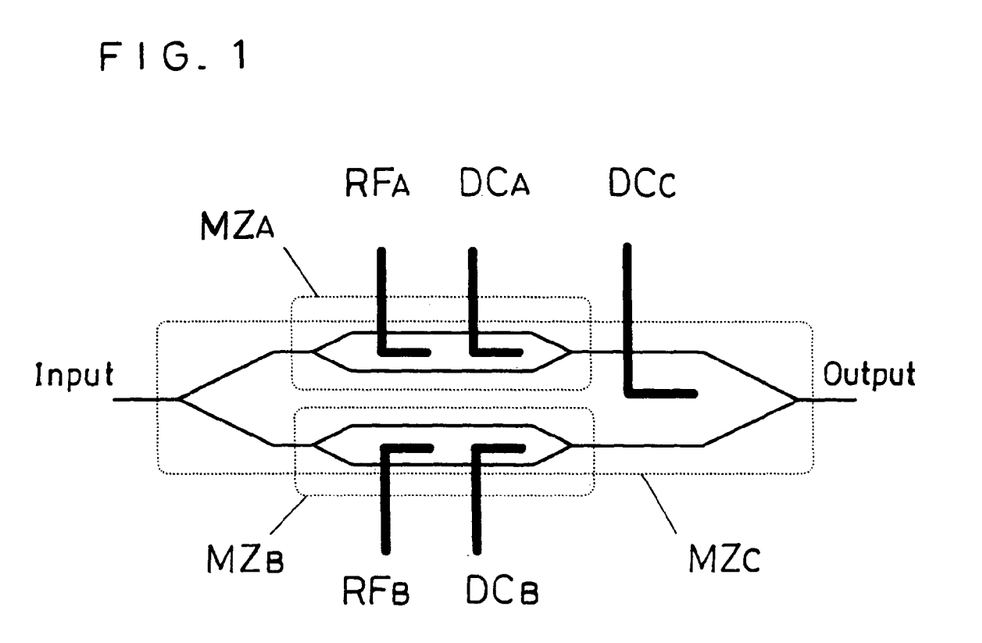
FIG. 1 is a schematic diagram of the configuration of a prior art Mach-Zehnder interferometer-type SSB modulator.

In particular, Reference 2 describes modulation using an SSB modulator constituted by the optical frequency shifter using X-cut LiNbO$_3$ shown in FIG. 1. With reference to FIG. 1, an optical carrier is input and a modulated light wave is output, using a modulator 1. The modulator 1 comprises a Mach-Zehnder interferometer (MZ$_C$) type SSB modulator that uses first and second Mach-Zehnder interferometer type phase modulators (MZ$_A$) and (MZ$_B$) provided on respective optical paths to modulate the above optical carrier. Here, it is assumed that the incident light is exp(jωt) when ω is the angular frequency of the incident light, Ω is the angular frequency of the microwave signal and Ø is the degree of modulation, and for the sake of the explanation it is assumed that the modulating microwave signal is a monotone signal Ø sin(Ωt). This signal is applied to RF$_A$ of the modulator 1 and signal Ø cos(Ωt) is applied to RF$_B$ of the modulator 1.

This signal is the above signal phase shifted by π/2 (90 degrees), and therefore can be generated from the same signal by using a phase shifter. Also, a bias voltage is applied to DC$_C$, to apply a phase difference of π/2 (90 degrees) between light waves transmitted by the two arms of MZ$_C$. Simultaneously, a bias voltage is applied to DC$_A$ and DC$_B$, applying a phase difference π (180 degrees) between light waves transmitted by the respective arms of MZ$_A$ and MZ$_B$, suppressing the carrier. That is, the light waves passing through the MZ$_A$ are subjected to electric fields having mutually opposed orientations and are given a phase differential, so that the output from the MZ$_A$ is as follows.

$$f_A(t) = \exp(j\omega t)\{\exp(j\emptyset \sin(\Omega t)) + \exp(-j\emptyset \sin(\Omega t))\exp(j\pi)\} \quad (1)$$

And, the light waves passing through the MZ$_B$ are as follows.

$$f_B(t) = \exp(j\omega t)\{\exp(j\emptyset \cos(\Omega t)) + \exp(-j\emptyset \cos(\Omega t))\exp(j\pi)\} \quad (2)$$

Therefore, a light wave output from MZ$_C$ will be $$f_C(t) = \exp(j\omega t)\begin{bmatrix} \{\exp(j\emptyset\sin(\Omega t)) + \exp(-j\emptyset\sin(\Omega t))\exp(j\pi)\} + \\ \exp(j\emptyset\cos(\Omega t)) + \exp(-j\emptyset\cos(\Omega t))\exp(j\pi)\}\exp(j\pi/2) \end{bmatrix} \quad (3)$$

Ignoring fifth-orders and higher as being very minor, we get equation (4).

$$f_C(t) = \exp(j\omega t)\{J_{+3}(\emptyset)\exp(j3\Omega t) + J_{-1}(\emptyset)\exp(-j\Omega t)\} \quad (4)$$

From equation (4), it can be seen that a first-order lower-sideband and a third-order upper-sideband are output. It is well known that the modulation index Ø can be decreased to damp higher-order terms. Also, estimating as in the above, applying a phase difference of −π/2 (−90 degrees) between the light waves traveling through the two arms of MZ$_C$ makes it possible to derive a first-order upper-sideband and a third-order lower-sideband.

As described above, with an optical frequency converter using conventional optical SSB modulation, the drawback is that output of a first-order sideband is accompanied by a third-order sideband. Moreover, a higher modulation index Ø gives rise to the output of larger sidebands corresponding to higher-order odd-numbered terms.

In the above explanation, Ø sin(Ωt) is applied to RF$_A$, and Ø cos(Ωt) is applied to RF$_B$ having a phase difference of 90 degrees compared to Ø sin(Ωt). If the phase difference deviates from 90 degrees, the term cancelled in equation (3) will not be cancelled, and third- and higher-order terms will increase, increasing the noise component.

An optical frequency converter that uses optical SSB modulation has the merit of not having to adjust a filter when the microwave signal is changed, since the converter does not use a filter. However, a drawback is that the converted-optical-frequency optical signal that is obtained includes third- and higher-order odd-numbered sidebands.

With respect to a frequency converter that uses optical SSB modulation, the present invention achieves a low-noise optical frequency converter that makes it possible to obtain an optical signal in which third-order sidebands, which among third- and higher-order odd-numbered sidebands have the highest signal strength, are suppressed.

In the case of optical frequency conversion using optical SSB modulation, it is necessary to prepare modulation signals having a 90-degree phase difference. Deviation from this 90-degree phase difference increases the noise component. Thus, noise can also be reduced if such deviation is suppressed.

Moreover, there is the merit that there is no need to adjust a filter when the microwave modulation signal is changed, since there is no filter. And there is the drawback that the converted-optical-frequency optical signal that is obtained includes fifth- and higher-order odd-numbered sidebands. Low-noise conversion can be achieved by suppressing these sidebands.

The present invention was accomplished in the light of the foregoing circumstances, and has as its object to provide a low-noise optical frequency converter that uses optical SSB modulation but is able to suppress noise components even when there is a deviation from the 90-degree phase difference between the two signals used for the modulation, and is able to suppress the third-order sidebands that have the highest signal strength among third- and higher-order odd-numbered sidebands.

SUMMARY OF THE INVENTION

To attain the above object, a first aspect of the invention provides a low-noise optical frequency converter, comprising a frequency converter that uses a predetermined microwave electric signal to modulate an input light wave and output a light wave that includes a first-order upper-sideband or lower-sideband and a third-order lower-sideband or upper-sideband, the frequency converter including a first constitution for modulating a light wave identical to the input light wave with a signal having an angular frequency that is three times that of the microwave electric signal to form a first light wave having a first-order lower-sideband or upper-sideband, and a second constitution for mixing the first light wave with a second light wave having a first-order upper-sideband or lower-sideband and a third-order lower-sideband or upper-sideband, with a phase of the third-order lower-sideband or upper-sideband reversed to a phase of the first light wave, the second constitution having a function of suppressing a third-order sideband.

In a second aspect, the low-noise optical frequency converter is attained using a Mach-Zehnder interferometer type SSB modulator.

In a third aspect, the modulation signal is processed with a 90-degree hybrid and the processed signal is used for SSB modulation to simplify the constitution of the converter.

In a fourth aspect, even when in the course of constituting a low-noise optical frequency converter using a Mach-Zehnder interferometer type SSB modulator there is a phase difference other than that of substantially 90 degrees between two signals having a phase difference of substantially 90 degrees that are applied to the Mach-Zehnder interferometer type SSB modulator, noise components of the Mach-Zehnder interferometer type SSB modulator are suppressed by changing a bias voltage applied to the Mach-Zehnder interferometer type SSB modulator in accordance with the phase difference.

In a fifth aspect, a fundamental wave constituting the two modulation signals input to the Mach-Zehnder interferometer type SSB modulator and a wave having a frequency three times the frequency of the fundamental wave are generated from the same signal to suppress relative variation in frequency or phase.

A sixth aspect is attained through combination of the third aspect with the fourth or fifth aspect.

In a seventh aspect, a frequency sweep optical generator is constituted by periodically changing a frequency of the microwave electric signal used as the modulation signal by the Mach-Zehnder interferometer type SSB modulator.

In an eighth aspect, when the frequency sweep optical generator is thus constituted in order to suppress noise components in the sweep frequency bands, the bias voltage applied to the Mach-Zehnder interferometer type SSB modulator is applied automatically according to the sweep frequency.

The principle of the invention will now be explained.

When there is a slight deviation from a phase difference of 90 degrees between the two modulation signals, in the case of the above explanation in which $\varnothing \sin(\Omega t)$ is applied to $RF_A$ and $\varnothing \cos(\Omega t)$ having a phase difference of 90 degrees compared to $\varnothing \sin(\Omega t)$ is applied to $RF_B$, $\varnothing \cos(\Omega t)$ would become $\varnothing \cos(\Omega t + \delta)$, for example, $\delta$ being a small angle corresponding to the deviation. As is clear from equation (3), changing the $j\pi/2$ term of $\exp(j\pi/2)$ by just $\epsilon$ enables the contribution of $\delta$ to be cancelled out by the contribution of $\epsilon$. This shows that it is possible to suppress the effect of deviation in the phase of modulation signals by changing the modulator bias voltage.

The above explanation relating to equations (1) to (4) was made with reference to optical SSB modulation by the SSB converter shown in FIG. 1, using a microwave signal of angular frequency $\Omega$. From these results, it can be understood that the following sidebands can be obtained in the case of SSB modulation using the following microwave signals having an angular frequency of $3\Omega\{RF_A: -\varnothing \sin(3\Omega t)$ and $RF_B: \varnothing \cos(3\Omega t)\}$.

$$f_{3\Omega}(t) = \exp(j\omega t)\{J_{-3}(\varnothing_{3\Omega})\exp(-j9\Omega t) - J_{+1}(\varnothing_{3\Omega})\exp(j3\Omega t)\} \quad (5)$$

Equation (6) can be obtained from the sum of equations (5) and (4).

$$f_C(t) + f_{3\Omega}(t) = \exp(j\omega t) \times [J_{-1}(\varnothing)\exp(-j\Omega t) + (J_{+3}(\varnothing) - J_{+1}(\varnothing_{3\Omega}))\exp(j3\Omega t) + J_{-3}(\varnothing_{3\Omega})\exp(-j9\Omega t)] \quad (6)$$

Thus it can be seen that in accordance with the following, it is possible to suppress a third-order upper-sideband without affecting a first-order lower sideband.

$$(J_{+3}(\varnothing) - J_{+1}(\varnothing_{3\Omega})) = 0 \quad (7)$$

It is also clear that using a microwave signal of angular frequency $5\Omega$ to perform the same operation on an input signal that is the same as the above makes it possible to also suppress fifth-order sidebands. In this way, higher-order sideband components can be extracted, making it possible to achieve a low-noise optical frequency converter.

Further features of the invention, its nature and various advantages will be more apparent from the accompanying drawings and following detailed description of the invention.

DESCRIPTION OF THE PREFERRED EMBODIMENT

Figure 2:
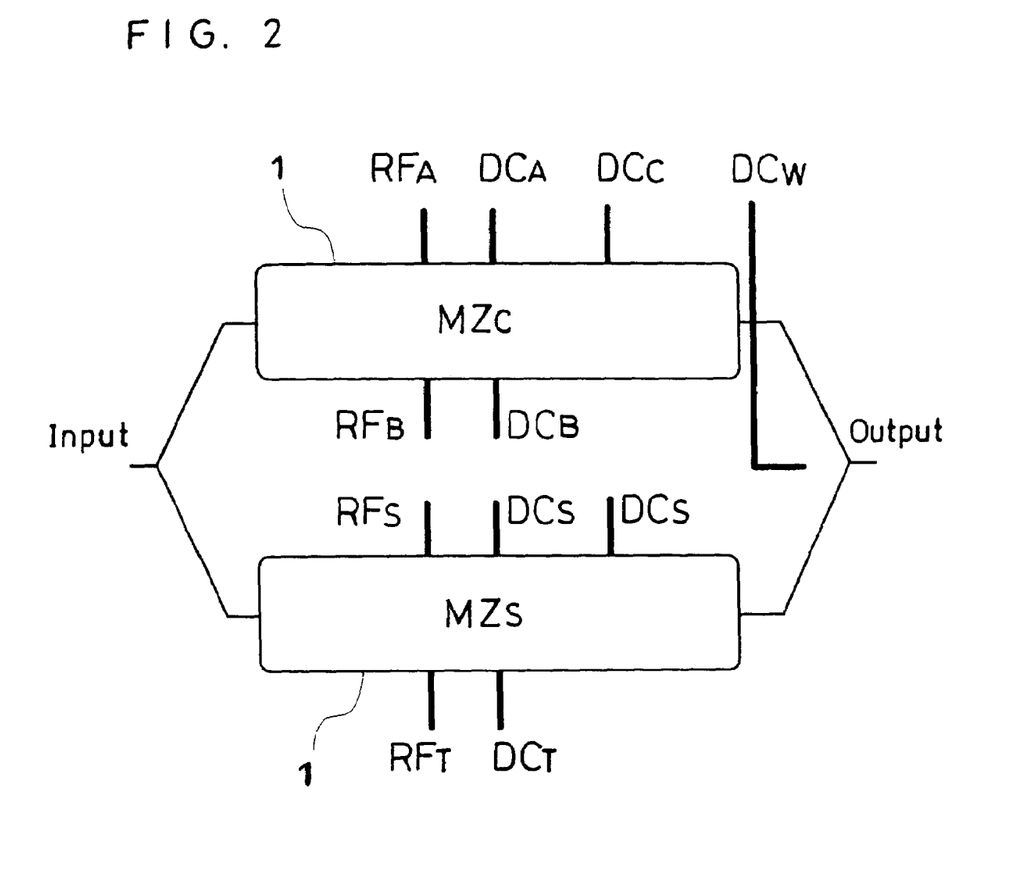
FIG. 2 is a schematic diagram of a low-noise optical frequency converter of the invention.

FIG. 2 shows an example of a preferred configuration for attaining a low-noise optical frequency converter based on the above principle. The configuration of FIG. 2 is provided with two SSB modulators, $MZ_C$ and $MZ_S$, each having the constitution of the modulator 1 shown in FIG. 1. A modulation signal having an angular frequency $\Omega$ is applied to the modulator $MZ_C$, and a modulation signal having an angular frequency $3\Omega$, which has offset by $\pi/2$ (90 degrees), is applied to the other modulator $MZ_S$. These modulation signals modulate input light, and the optical outputs thus modulated by each modulation signal are mixed to have an opposite phase to that of signal components that inhibit the output.

To illustrate this more specifically, it will be assumed that the following signals are applied to the terminals.

$RF_A$: $\sin(\Omega t)$, $RF_B$: $\cos(\Omega t)$, $RS_S$: $-\sin(3\Omega t)$, and $RF_T$: $\cos(3\Omega t)$ Here, a bias voltage that produces the same phase relationship as that of the SSB modulator of FIG. 1 is applied to terminals $DC_A$ and $DC_B$, and $DC_S$ and $DC_T$. In cases where there are a first-order upper-sideband and a third-order lower-sideband, an analogous control can be used to suppress the third-order lower-sideband.

Figure 3:
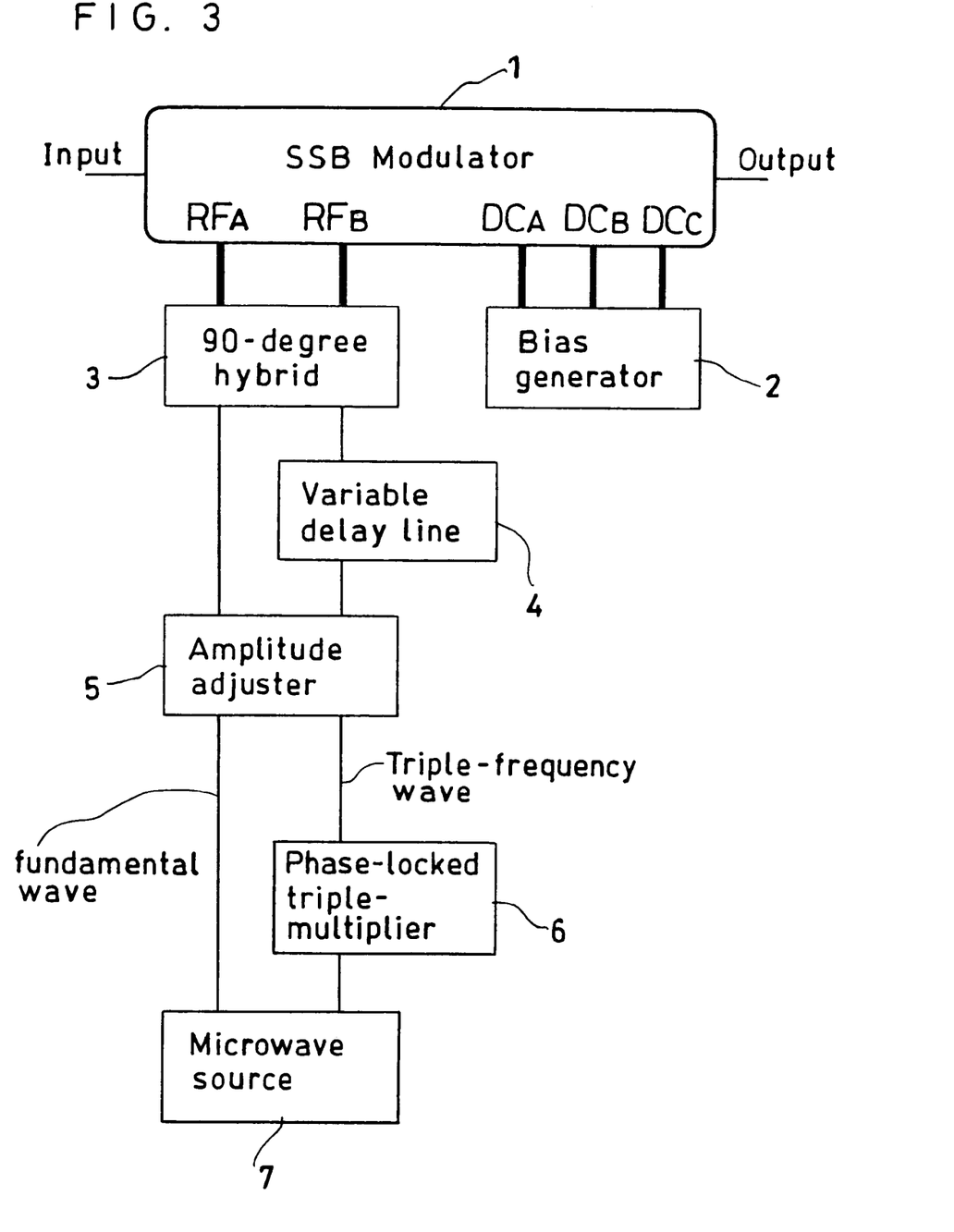
FIG. 3 is also a schematic diagram of another low-noise optical frequency converter of the invention.

The constitution shown in FIG. 2 can be simplified utilizing characteristics relating to superimposition of electromagnetic waves. FIG. 3 shows a preferred configuration thus simplified. In this constitution, the same modulator is used for angular frequency $\Omega$ modulation and angular frequency $3\Omega$ modulation. A merit of this configuration is that the degree of any change in the optical path length or the like caused by changes in the temperature of the parts will be the same, and so will be cancelled out when the waves are mixed. As an example, in the case of the low-noise optical frequency converter shown in FIG. 3, an input coherent light wave having a wavelength of 1.55 microns is output after SSB modulation with a 3-GHz microwave signal. The SSB modulation is performed by the SSB modulator 1, which outputs first-order sidebands and third- or higher-order sidebands. An example of this modulator is the Mach-Zehnder interferometer type SSB modulator shown in FIG. 1. An X-cut LN SSB-SC modulator (Model T.SBX1.5-10-ADC) manufactured by Sumitomo-Osaka Cement Co., Ltd. can be utilized. The Z-cut SSB modulator using lithium niobate crystal, described in Reference 1, can also be used.

The microwave signal input to the SSB modulator is composed of the fundamental wave from a microwave source 7 and a wave having a frequency three times the frequency of the fundamental wave. The triple-frequency wave can be generated as phase-locked with the fundamental wave, or phase-locked with a signal based on the fundamental wave. In the case of FIG. 3, the signal phase-locked to the fundamental wave is generated by a triple-multiplier 6. To have this wave satisfy the relationship of equation (7), it is amplified or attenuated by an amplitude adjuster 5. The signal is also delayed by a variable delay line 4 to impart a phase difference, and is then superimposed on the fundamental wave by a 90-degree hybrid 3, which divides the signal into two modulation signals having a phase difference of $\pi/2$ (=90 degrees). The 90-degree hybrid has to be of a wide-band type. The model number 1831 hybrid manufactured by the Krystar company can be used. When these modulation signals are applied to the Mach-Zehnder interferometer type SSB modulator 1, signal phase combinations are as listed below.

Combination 1:
Phase of fundamental wave applied to $RF_A$=0
Phase of fundamental wave applied to $RF_B$=90 degrees
Phase of triple-frequency wave applied to $RF_A$ phase modulator=0
Phase of triple-frequency wave applied to $RF_B$=−90 degrees Combination 2:
Phase of fundamental wave applied to $RF_A$=0
Phase of fundamental wave applied to $RF_B$=−90 degrees
Phase of triple-frequency wave applied to $RF_A$=0
Phase of triple-frequency wave applied to $RF_B$=90 degrees A bias generator 2 applies a bias to each bias terminal to produce the same phase relationship as in the case of the SSB modulator of FIG. 1.

In most cases, the phase difference between the two signals output by the 90-degree hybrid deviates slightly from 90 degrees. When the two waves thus output from the 90-degree hybrid into which the fundamental wave has been input are input to $RF_A$ and $RF_B$ of the SSB modulator of FIG. 1, in the case of SSB modulation that outputs a first-order upper-sideband, for example, a first-order lower-sideband will be output without being cancelled. In this case, it can be readily understood that the first-order lower-sideband can be cancelled by adjusting the bias voltage applied to $DC_C$. This means noise components caused by the characteristic phase imbalance of the 90-degree hybrid can be suppressed by adjusting the bias voltage applied to $DC_C$.

This phase imbalance is usually frequency-dependent, and so the phase imbalance in the case of the fundamental wave will differ from that in the case of the triple-frequency wave. The configuration of FIG. 2 is used to suppress noise components arising from third-order sidebands. First, the bias voltage applied to $DC_C$ is adjusted using $MZ_C$ and $MZ_S$ to suppress noise components arising from the characteristic phase imbalance of the 90-degree hybrid. Then, $DC_W$ is adjusted to suppress the noise component caused by the third-order sidebands.

Figure 4:
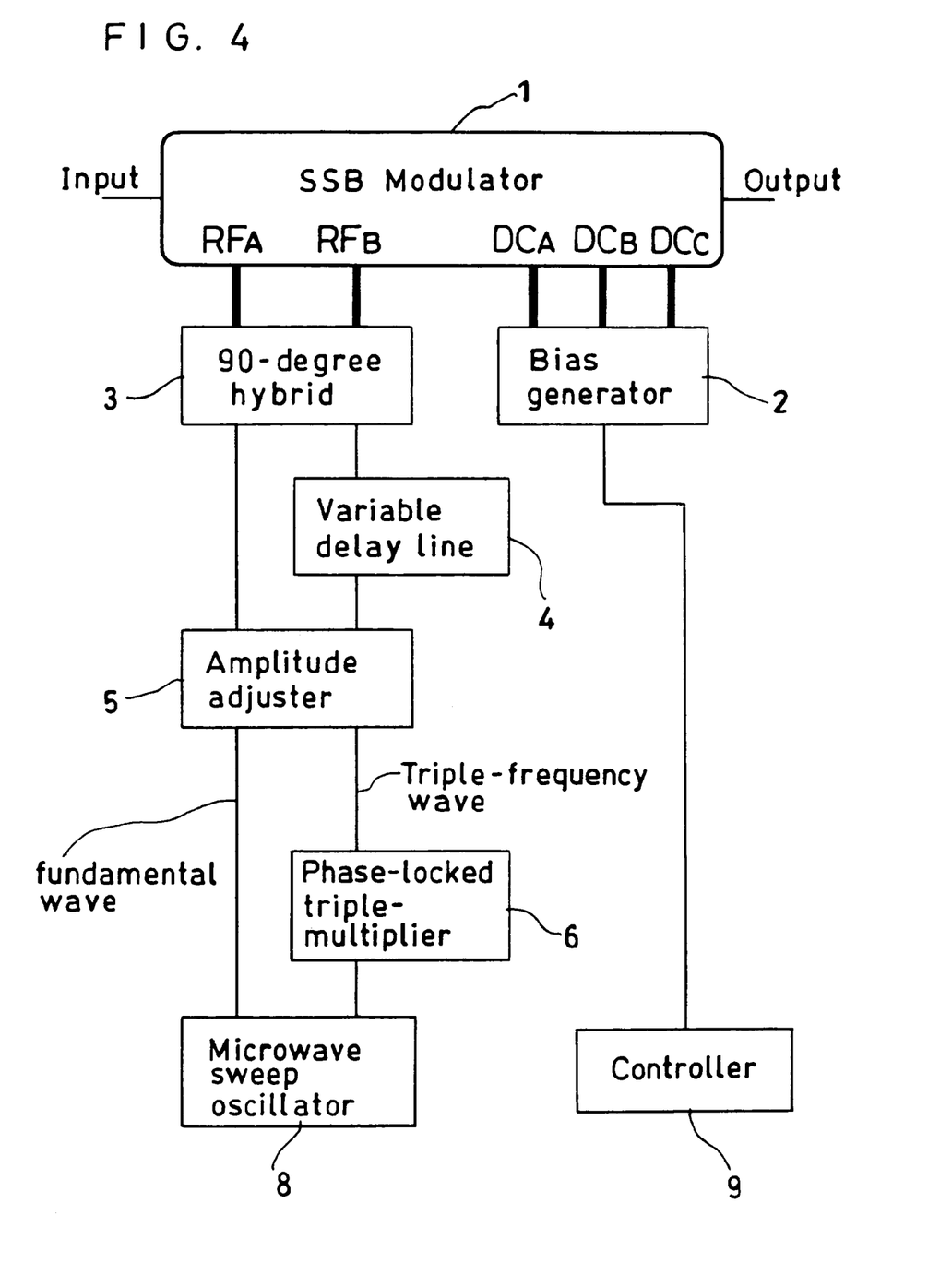
FIG. 4 is also a schematic diagram of still another low-noise optical frequency converter of the invention.

In the configuration shown in FIG. 4, the microwave source 7 of FIG. 3 has been changed to a microwave sweep oscillator 8, and the sweep oscillator 8 and the bias generator 2 are controlled with a controller 9. Due to the fact that the characteristic phase imbalance of the 90-degree hybrid changes when the sweep oscillator 8 performs a sweep at the oscillation frequency, within the sweep segment it may be difficult to bring the noise component down to or below the reference value.

In such a case, the relationship between the bias voltage and the oscillation frequency that enables noise components to be suppressed are obtained with respect to each bias terminal and the bias voltage is controlled according to each sweep frequency. The controller 9 of FIG. 4 is used to control the sweep frequency and bias voltage in accordance with this method.

In the foregoing explanation, the main focus is on suppressing third-order sidebands. However, the frequency converter is not limited to third-order sidebands, with higher-order sidebands also becoming a noise factor. In the example of FIG. 3, the right side of the equation (6) is approximately realized, but in stricter terms, there is also a slight output of lower-order or higher-order sidebands, which also constitute noise. Therefore, in practice it is desirable to adjust the amplitude of the triple-frequency wave, or the phase with respect to the fundamental wave thereof, to minimize the power spectra of other than the target sidebands. In such a case, bias voltages applied to bias terminals and optimum conditions relating to the modulation index, will deviate from the above conditions, but this deviation will generally be very slight.

In accordance with the first aspect of the invention, when the frequency of an optical carrier is converted by SSB modulation, a higher-order sideband is generated in addition to the target sideband, but this can be suppressed by using a constitution that generates a sideband having an opposite phase to that of the higher-order sideband.

In accordance with the second aspect, while a higher-order sideband is generated in addition to the target sideband in the course of frequency conversion with a Mach-Zehnder interferometer type SSB modulator, using a constitution in which the higher-order sideband is offset by an opposite-phase sideband enables this to be suppressed by inputting the fundamental wave and a wave having a frequency three times the frequency of the fundamental wave to the SSB modulator and adjusting the phase difference thereof.

In accordance with the third aspect, a 90-degree hybrid is used to split the modulation signal in the second aspect into two signals having a phase difference of substantially 90 degrees, which simplifies the constitution of the apparatus.

In accordance with the fourth aspect, even if in the course of the frequency conversion of the optical carrier by SSB modulation there is a noise component caused by slight deviation from the 90 degrees phase difference between the modulation signals, the noise component can be suppressed by merely adjusting the bias voltage applied to the low-noise optical frequency converter.

In accordance with the fifth aspect, while a higher-order sideband is generated in addition to the target sideband in the course of frequency conversion with a Mach-Zehnder interferometer type SSB modulator, using a constitution in which the higher-order sideband is offset by an opposite-phase sideband enables this to be suppressed by inputting the fundamental wave and a wave having a frequency three times the frequency of the fundamental wave to the SSB modulator and adjusting the phase difference thereof.

In accordance with the sixth aspect, a 90-degree hybrid is used to split the modulation signal in the fourth aspect into two signals having a phase difference of substantially 90 degrees, which simplifies the constitution of the apparatus.

In accordance with the seventh aspect, a frequency sweep optical generator can be realized by using a microwave electric signal with a frequency that changes periodically.

In accordance with the eighth aspect, a frequency sweep optical generator can be realized that suppresses noise components even when the 90-degree hybrid has a phase imbalance characteristic.

What is claimed is:

1. A low-noise optical frequency converter, comprising:
   means for converting an input light wave with a predetermined microwave electric signal to output a light wave that includes a first-order upper-sideband or lower-sideband and a third-order lower-sideband or upper-sideband,
   means for modulating a light wave identical to the input light wave with a signal having an angular frequency that is three times that of the microwave electric signal to form a first light wave having a first-order lower-sideband or upper-sideband, and
   means for mixing the first light wave with a second light wave having a first-order upper-sideband or lower-sideband and a third-order lower-sideband or upper-sideband, with a phase of the third-order lower-sideband or upper-sideband reversed to a phase of the first light wave to suppress third-order sidebands.

2. A low-noise optical frequency converter, comprising:
   a light wave input section;
   a modulation signal input section;
   a modulated light wave output section;
   a Mach-Zehnder interferometer type single sideband (SSB) modulator configured to modulate a light wave input to the light wave input section, provided with a first Mach-Zehnder interferometer type optical modulator and a second Mach-Zehnder interferometer type optical modulator on respective optical paths;
   means for inputting a fundamental wave of a predetermined microwave electric signal;
   a circuit configured to generate a wave having a frequency that is triple a frequency of the fundamental wave;
   means for adjusting an amplitude of the triple-frequency wave;
   delay means for adjusting a phase difference between the fundamental wave and the triple-frequency wave;
   means for mixing the fundamental wave and the triple-frequency wave and generating an output; and
   means for applying the mixing means output to the modulation signal input section;
   wherein a noise component arising from the fundamental wave of the microwave electric signal is suppressed by a light wave component produced by modulation of the mixing means output with the triple-frequency wave.

3. The low-noise optical frequency converter according to claim 2, wherein the means for mixing and the means for applying the mixing means output to the modulation signal input section are constituted by a 90-degree hybrid configured to split the mixed fundamental wave and triple-frequency wave into two signals having a phase difference of substantially 90 degrees.

4. A low-noise optical frequency converter, comprising:
   a light wave input section;
   a modulation signal input section;
   a modulated light wave output section;
   a Mach-Zehnder interferometer type single sideband (SSB) modulator configured to modulate a light wave input to the light wave input section, provided with a first Mach-Zehnder interferometer type phase modulator and a second Mach-Zehnder interferometer type phase modulator on respective optical paths;
   a first electrode configured to control a phase of a light wave provided on the first Mach-Zehnder interferometer type phase modulator;
   a second electrode configured to control a phase of a light wave provided on the second Mach-Zehnder interferometer type phase modulator;
   a third electrode configured to control a phase of a light wave propagating through each arm of the Mach-Zehnder interferometer type SSB modulator;
   means for inputting a fundamental wave of a predetermined microwave electric signal;
   means for generating a wave having a frequency that is triple a frequency of the fundamental wave;
   delay means for adjusting a phase difference between the fundamental wave being the microwave electric signal and the wave having a frequency that is triple a frequency of the fundamental wave;
   means for mixing the fundamental wave and the triple-frequency wave and splitting the mixed wave into two signals having a phase difference of substantially 90 degrees; and
   means for supplying electricity to the input section to which is input a signal used for modulating the signals;

wherein a noise component included in an output of the Mach-Zehnder interferometer type SSB modulator generated in accordance with the phase difference between the two signals having a phase difference of substantially 90 degrees is suppressed by adjusting a bias voltage applied to the third electrode in accordance with the phase difference between the two signals.

5. The low-noise optical frequency converter according to claim 4, wherein the means for splitting the mixed fundamental wave and triple-frequency wave into two signals having a phase difference of substantially 90 degrees is a 90-degree hybrid.

6. The low-noise optical frequency converter according to claim 5, wherein
the predetermined microwave electric signal is a microwave electric signal with a periodically changing frequency, with a frequency of output light changing in accordance with the frequency of the microwave electric signal.

7. The low-noise optical frequency converter according to claim 6, wherein
the predetermined microwave electric signal is a microwave electric signal having a frequency that changes on a time basis, a correspondence between the frequency and an optimum value for suppressing the noise component, to which a bias voltage inside the Mach-Zehnder interferometer type SSB modulator is adjusted based on the frequency, is obtained beforehand and the correspondence is used for adjusting to suppress the noise component.

8. The low-noise optical frequency converter according to claim 4, wherein
the predetermined microwave electric signal is a microwave electric signal with a periodically changing frequency, with a frequency of output light changing in accordance with the frequency of the microwave electric signal.

9. The low-noise optical frequency converter according to claim 8, wherein
the predetermined microwave electric signal is a microwave electric signal having a frequency that changes on a time basis, a correspondence between the frequency and an optimum value for suppressing the noise component, to which a bias voltage inside the Mach-Zehnder interferometer type SSB modulator is adjusted based on the frequency, is obtained beforehand and the correspondence is used for adjusting to suppress the noise component.

10. A low-noise optical frequency converter, comprising:
a light wave input section;
a modulation signal input section;
a modulated light wave output section;
a Mach-Zehnder interferometer type single sideband (SSB) modulator configured to modulate a light wave input to the light wave input section, provided with a first Mach-Zehnder interferometer type phase modulator and a second Mach-Zehnder interferometer type phase modulator on respective optical paths;
a first electrode configured to control a phase of a light wave provided on the first Mach-Zehnder interferometer type phase modulator;
a second electrode configured to control a phase of a light wave provided on the second Mach-Zehnder interferometer type phase modulator;
a third electrode configured to control a phase of a light wave propagating through each arm of the Mach-Zehnder interferometer type SSB modulator;
means for inputting a predetermined microwave electric signal;
means for splitting the microwave electric signal into two signals having a phase difference of substantially 90 degrees; and
means for applying the two signals to the modulation signal input section; wherein a noise component included in an output of the Mach-Zehnder interferometer type SSB modulator generated by the phase difference between the two signals having the phase difference of substantially 90 degrees is suppressed by adjusting a bias voltage applied to the third electrode in accordance with the phase difference between the two signals;
wherein the predetermined microwave electric signal is a microwave electric signal with a periodically changing frequency, with a frequency of output light changing in accordance with the frequency of the microwave electric signal.

11. The low-noise optical frequency converter according to claim 10, wherein
the predetermined microwave electric signal is a microwave electric signal having a frequency that changes on a time basis, a correspondence between the frequency and an optimum value for suppressing the noise component to which a bias voltage inside the Mach-Zehnder interferometer type SSB modulator is adjusted based on the frequency is obtained beforehand and the correspondence is used for adjusting to suppress the noise component.

12. A low-noise optical frequency converter, comprising:
a light wave input section;
a modulation signal input section;
a modulated light wave output section;
a Mach-Zehnder interferometer type signal sideband (SSB) modulator configured to modulate a light wave input to the light wave input section and provided with a first Mach-Zehnder interferometer type phase modulator and a second Mach-Zehnder interferometer type phase modulator on respective optical paths;
a first electrode configured to control a phase of a light wave provided on the first Mach-Zehnder interferometer type phase modulator;
a second electrode configured to control a phase of a light wave provided on the second Mach-Zehnder interferometer type phase modulator;
a third electrode configured to control a phase of a light wave propagating through each arm of the Mach-Zehnder interferometer type SSB modulator;
means for inputting a predetermined microwave electric signal;
means for splitting the microwave electric signal into two signals having a phase difference of substantially 90 degrees; and
means for applying the two signals to the modulation signal input section; wherein a noise component included in an output of the Mach-Zehnder interferometer type SSB modulator generated by the phase difference between the two signals having the phase difference of substantially 90 degrees is suppressed by adjusting a bias voltage applied to the third electrode in accordance with the phase difference between the two signals;
wherein the means for splitting the microwave electric signal into two signals having a phase difference of substantially 90 degrees is a 90-degree hybrid; and wherein the predetermined microwave electric signal is a microwave electric signal with a periodically changing frequency, with a frequency of output light changing in accordance with the frequency of the microwave electric signal.

13. The low-noise optical frequency converter according to claim 12, wherein
the predetermined microwave electric signal is a microwave electric signal having a frequency that changes on a time basis, a correspondence between the frequency and an optimum value for suppressing the noise component, to which a bias voltage inside the Mach-Zehnder interferometer type SSB modulator is adjusted based on the frequency, is obtained beforehand and the correspondence is used for adjusting to suppress the noise component.

* * * * *